Nov. 20, 1934.　　　C. W. KUHN　　　1,981,555
ELECTRIC CONTROL DEVICE
Filed Aug. 19, 1929　　　2 Sheets-Sheet 1

INVENTOR.
Clarence W. Kuhn
BY
Frank H. Hubbard
ATTORNEY

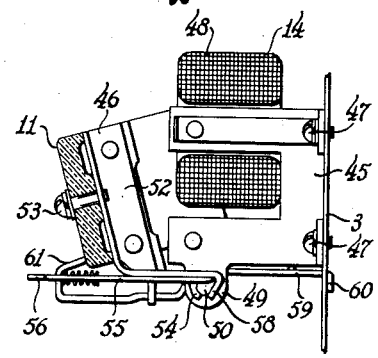
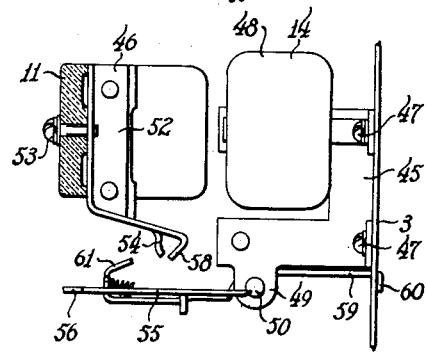
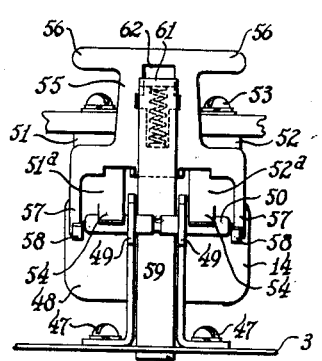
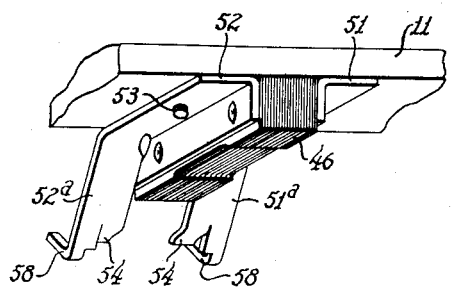
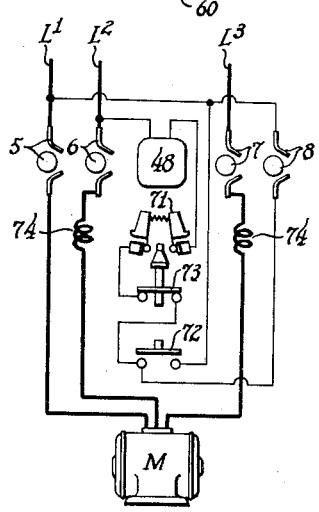
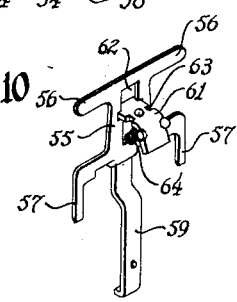

Patented Nov. 20, 1934

1,981,555

UNITED STATES PATENT OFFICE 1,981,555

ELECTRIC CONTROL DEVICE

Clarence W. Kuhn, Milwaukee, Wis., assignor to Cutler-Hammer, Inc., Milwaukee, Wis., a corporation of Delaware Application August 19, 1929, Serial No. 387,028

5 Claims. (Cl. 200—87)

This invention relates to electric control devices and is particularly applicable to electromagnetically operated starters for electric motors.

The invention has among its objects to provide a simplified and generally improved starter for electric motors.

Another object is to provide a motor starter employing an improved form of switch mechanism of the double break type.

Another object is to provide a unitary electromagnetic starting device including control means comprising start and stop push buttons and an overload protective device which is adapted to be reset by the latter push button.

Another object is to provide an enclosed motor starter having certain of its parts readily removable to facilitate inspection or repair of the operating magnet or the associated switch mechanism.

Various other objects and advantages of the invention will hereinafter appear.

The accompanying drawings illustrate an embodiment of the invention which will now be described, it being understood that various modifications may be made in the embodiment illustrated without departing from the spirit and scope of the appended claims.

In the drawings Figure 1 is a front elevational view of a motor starter embodying the invention, the cover of the enclosing case being open and only a portion thereof being shown.

Fig. 6 is a vertical sectional view of the operating magnet shown in Fig. 1.

Fig. 7 is a similar view of the operating magnet with its armature member removed from its pivot.

Fig. 8 is a view of the operating magnet taken on lines 8—8 of Fig. 1.

Fig. 9 is a perspective view of the armature member of the operating magnet.

Fig. 10 is a perspective view of certain of the parts shown in Fig. 8 and

Fig. 11 is a diagrammatic view illustrating the circuit connections for the starter shown in Fig. 1.

Figure 1:
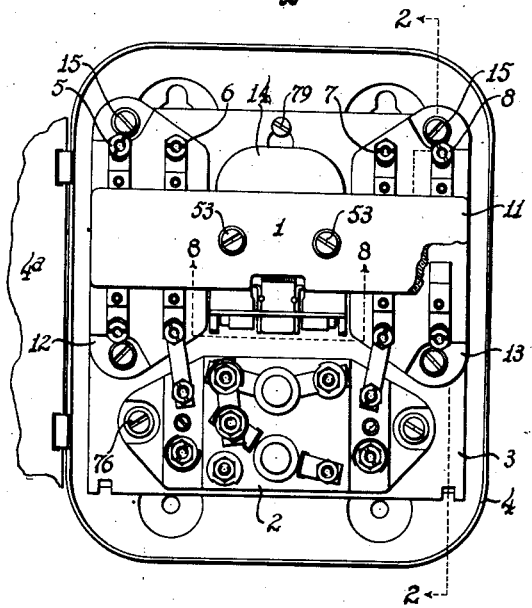
Figure 2:
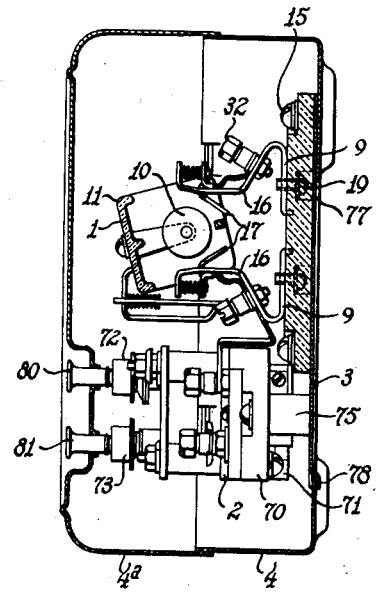
Fig. 2 is a vertical sectional view on lines 2—2 of Fig. 1 illustrating one of the poles of the switch mechanism in open position.

Referring to Figs. 1 and 2, the starter shown therein includes an electromagnetically operated switch mechanism 1 and an associated control unit 2 of the character disclosed in my copending application Serial No. 373,172 filed June 24, 1929 which became Patent No. 1,894,404 on Jan. 17, 1933. Switch mechanism 1 and its associated control unit 2 are fixed to a sheet metal panel 3 and as hereinafter set forth said panel is removably secured within an enclosing casing 4.

More specifically the switch mechanism 1 is of a 4-pole double break type and each of the poles 5, 6, 7 and 8 thereof includes a set of stationary contact elements 9—9 and a cooperating roller contact 10. The roller contacts 10 are carried by an insulating support 11 and the stationary contact elements of poles 5 and 6 are mounted upon an insulating base 12 while the stationary contact elements of poles 7 and 8 are mounted upon an insulating base 13. Support 11 is carried by the armature member of an electromagnet 14, and as hereinafter set forth said armature member and the insulating support carried thereby can be readily removed to facilitate inspection or repair of the magnet parts or the contact mechanism.

Figure 3:
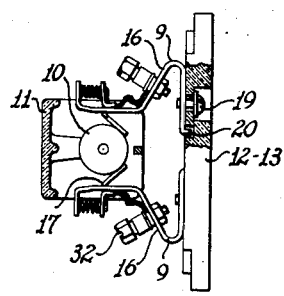
Fig. 3 is a sectional view illustrating one of the poles of the switch mechanism in closed position.
Figure 4:
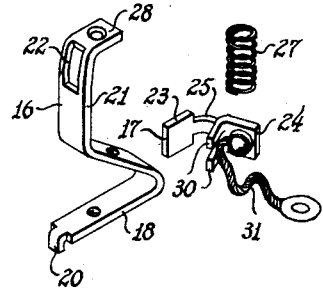
Fig. 4 is a perspective view of the parts of one of the stationary contact elements shown in Figs. 1, 2 and 3.

The insulating bases 12 and 13 are of like construction and as shown in Fig. 1 the same are arranged in opposed relation on opposite sides of the magnet 14, and are secured to panel 3 by screws 15. The contact elements 9—9 associated with each pole of the switch mechanism are arranged in opposed relation as shown in Fig. 2 and each includes a bracket 16 having a contact member 17 pivotally mounted thereon. As shown in Figs. 3 and 4 each of the brackets 16 has a base portion 18 which is secured to its associated insulating base by a screw 19. Also as shown in Fig. 3 the openings for the screws 19 in the insulating bases 12 and 13 are elongated to permit vertical adjustment of the brackets 16 and said insulating bases are provided with openings for receiving projections 20 on the base portions of the brackets 16 to prevent turning of the latter.

Each of the brackets 16 is also provided with an extension 21 having an opening 22 therein for receiving its associated contact member 17. As shown in Fig. 4 contact member 17 is provided with a contact portion 23 and a tail piece 24 which is connected to said contact portion by a neck 25 of reduced width. Contact member 17 is mounted on its associated bracket 16 so that the neck 25 thereof is adapted to rock upon the inner edge of the opening 22 in said bracket and said contact member is biased towards the position shown in Fig. 2 by a spring 27. Spring 27 is held under compression between the tail piece 24 of contact member 17 and an angular projection 28 on the upper end of bracket extension 21 and movement of contact element 17 under the action of said spring is limited by a pair of projecting lugs 30 on the inner end of said tail piece which are adapted to engage the rear face of bracket 16. Contact member 17 is preferably provided with a flexible lead 31 which is connected to its associated bracket 16 by a binding post 32.

In connection with the foregoing it should be noted that upon assembly of the contact members 17 with their associated brackets 16 the same are locked against removal. However, said contact members can be readily removed by tilting the same at an angle of substantially 90 degrees in which position the contact portion 23 is movable outwardly through the opening 22 in bracket 16.

Figure 5:
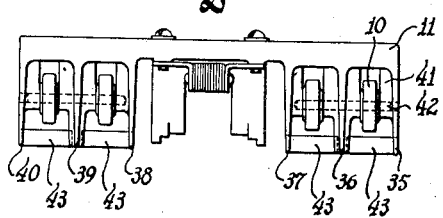
Fig. 5 is a top view of the movable contact element of the switch mechanism shown in Figs. 1 and 2.

As hereinbefore set forth the roller contacts 10 are carried by an insulating support 11, and as shown in Fig. 5 said support is provided with two sets of projecting barriers 35, 36, 37 and 38, 39, 40. The former set of barriers are arranged on opposite sides of the roller contacts associated with poles 5 and 6 while the latter set of barriers are arranged on opposite sides of the roller contacts associated with poles 7 and 8. Each of the roller contacts 10 is held in centered relation with respect to its associated barriers by projections 41 on the latter and each set of barriers carries an insulating pin 42 upon which the associated roller contacts 10 are rotatably mounted. Also for purposes hereinafter set forth each set of barriers carries a metal strip 43 which is arranged adjacent its associated roller contact 10.

As before stated the insulating support 11 is carried by the armature member of an electromagnet 14. Said magnet includes a U-shaped laminated field member 45 and a cooperating laminated armature member 46. The field member is secured to panel 3 by screws 47 and one of the legs thereof carries a magnet winding 48 while the other leg thereof is provided with spaced projections 49—49 which carry a pivot pin 50. The ends of pivot pin 50 project outwardly beyond the supporting lugs 49 and the armature member 46 is removably secured to the projecting ends of said pin by mechanism which will be hereinafter described.

As shown in Fig. 9 the armature member 46 is made up of laminations held between bracket members 51 and 52 which are fixed to insulating support 11 by screws 53. The bracket members 51 and 52 are respectively provided with inwardly extending projections 51a and 52a, each of which is provided with a curved bearing portion 54. The bearing portions 54 are adapted to ride upon the front surface of the projecting ends of pivot pin 50 and said bearing portions are releasably held in engagement with said pin by a spring pressed locking member 55. As shown in Fig. 8 locking member 55 is provided with handle projections 56—56 and a pair of spaced legs 57—57 which are adapted to engage hooked extensions 58 on the bracket projections 51a and 52a. Member 55 is slidably mounted upon a support 59 which is arranged between pivot pin 50 and field member 45 and is anchored at its inner end to panel 3, as shown at 60. The outer end of support 59 has a projection 61 which extends upwardly through an opening 62 in locking member 55 and forms a stop for the armature member 46 and the parts carried thereby as shown in Fig. 6. The projection 61 is provided with a portion 63 of reduced width upon which the locking member 55 is slidably mounted. The opening 62 in locking member 55 is formed as shown in Fig. 10 and upon a given outward movement of said member from the position shown in Fig. 6 said opening permits downward movement of said member with respect to support 59 to the position shown in Figs. 7 and 10. As is apparent when the member 55 is in the position shown in Fig. 10 the same is locked against inward movement with respect to support 59. By moving locking member 55 upwardly from the position shown in Fig. 6 the same can be brought into alinement with the reduced portion 63 of support 59. Locking member 55 is then movable inwardly under the action of a spring 64, which is held under compression between the underside of projection 61 on supporting member 59 and the inner edge of the opening 61 in said locking member.

In connection with the foregoing it should be noted that when locking member 55 is in the position shown in Fig. 6 the bearing portions 54 of the armature member 46 are securely held in position on pivot pin 50. However by moving the locking member 55 to the position shown in Fig. 7 said member is moved out of engagement with the hooked extensions 58 on the armature member and the latter can then be removed by upward and outward movement thereof. It should also be noted that when the locking member is in the position shown in Fig. 6 the same exerts an inward pressure on the armature member 46 on a line above the axis of pivot pin 50. Such pressure tends to counteract the weight of the armature member and the parts carried thereby and thereby reduces the operating force required to effect closure of the switch.

The aforedescribed switch mechanism also possesses numerous other advantages. In practice it has been found that the roller contacts cooperate with their associated stationary contacts to insure good electrical contact upon closure of the switch and to minimize arcing upon opening of the switch. Also it has been found that the metal strips 43 associated with the roller contacts 10 deflect the arc away from said roller contacts during opening of the switch, which is obviously a desirable feature.

The control unit 2 is mounted on the panel 3 and is arranged below the aforedescribed switch mechanism. As set forth in the aforementioned copending application said control unit includes an insulating base 70, having an electro-thermal cutout device 71 mounted on the rear thereof, and having a normally open start push button switch 72 and a normally closed stop push button switch 73 mounted on the front thereof. Cutout device 71, start push button switch 72 and stop push button switch 73 are diagrammatically shown in Fig. 11 and as shown in this figure said cutout device includes a pair of normally closed contact elements each having an electric heater 74 associated therewith. This figure also diagrammatically illustrates the means employed for effecting resetting of the cutout device 71 upon opening of stop push button switch 73. As shown in Figs. 1 and 2 the insulating base 70 of control device 2 is held in spaced relation with respect to the panel 3 by insulating bushings 75 and said base is secured to said panel by screws 76 passing through said bushings.

As shown in Fig. 11 the above described control device is adapted to control the line connections of an alternating current motor M to start and stop the motor and to provide for overload protection thereof. As shown in this figure the motor is adapted to be connected to a three-phase supply circuit indicated by lines L¹, L² and L³, by means of the poles 5, 6 and 7 of the aforedescribed switch mechanism and each of the heaters 74 is connected in one of the supply conductors of the motor. It will be observed that the cutout device 71, start push button switch 72 and stop push button switch 73 are connected in series in the energizing circuit of the magnet winding 48, and upon depression of said start switch said magnet winding is connected across lines L¹, L². Upon closure of the switch mechanism the same is adapted to maintain itself by a circuit extending from line L¹ through the pole 8 through the stop switch 73, through the cutout device 71 and thence through the operating coil 48 to line L². Under given overload conditions one or both of the contact elements of the cutout device are released under the action of the heaters 74 and the aforedescribed maintaining circuit for coil 48 is interrupted to effect opening of the switch mechanism. The maintaining circuit for coil 48 can also be interrupted to stop the motor at any time by depression of the stop push button switch 73. Upon opening of either of the contact elements of the cutout device 71 said contact element can be reset by depression of the stop push button switch 73. As before stated the aforedescribed switch mechanism is mounted within an enclosing casing 4. The rear wall of said casing is provided with an opening 77 and the lower edge of panel 3 is provided with inwardly struck portions 78 which are adapted to hook over the lower edge of said opening. Panel 3 is fixed within said casing by a screw 79 which is located within an opening in said panel and is threaded into the rear wall of casing 4. The enclosing casing is provided with a hinged cover 4ª and as shown in Fig. 2 the front wall of said cover has a pair of push button elements 80, 81 reciprocably mounted within openings therein. Said push button elements are arranged to cooperate with the start push button switch 72 and stop push button switch 73 when the cover 4ª is in closed position and thus provide means for operating said push button switches from the exterior of the casing.

I claim:—

1. A switch including a supporting panel, cooperating pairs of stationary contact elements mounted on the front of said panel, a pivoted insulating cross bar mounted on said panel and having a plurality of projecting barriers arranged on opposite sides of each pair of stationary contact elements and a plurality of bridging contacts carried by said bar each of said bridging contacts being mounted between a pair of barriers on said cross bar and being adapted to bridge a pair of said stationary contact elements.

2. In an electric switch, the combination with a movable contact element biased by gravity towards open position, a fixed part, said contact element having an open pivotal bearing on said fixed part and a resilient device for holding said contact element in assembled relation upon said fixed part, said device being arranged to exert a biasing force on said contact element tending to move the same out of open position but insufficient to overcome the gravity bias thereof towards such position.

3. In an electromagnetic switch, the combination with an operating electromagnet having a field member and a cooperating armature member, said field member having a fixed pivot part associated therewith, of an insulating contact carrier secured to said armature member and provided with an open bearing for receiving said pivot part, said contact carrier being biased by gravity towards one position and being movable upon said pivot part into another position upon energization of said electromagnet, and a resilient device associated with said contact element for holding the open bearing thereof in engagement with said pivot part, said device being arranged to exert a biasing force on said contact element in opposition to the gravity bias of said element, but insufficient to overcome such gravity bias.

4. In an electromagnetic switch, the combination with an operating electromagnet having a field member and a cooperating armature member, said field member having projecting pivot parts on opposite sides thereof, of an insulated contact carrier secured to said armature member and provided with supporting parts having open bearings for receiving said pivot parts and a spring pressure device including a stationary holder and a spring pressed part carried by said holder, said spring pressed part being arranged to engage the supporting parts of said contact carrier to hold the open bearings thereof in engagement with said pivot parts.

5. In an electromagnetic switch, the combination with an operating electromagnet having a field member and a cooperating armature member, said field member having a pivot pin projecting outwardly on opposite sides thereof, of an insulated contact carrier secured to said armature member and having supporting parts provided with open bearings for receiving the projecting end portions of said pivot pin, said supporting parts being also provided with hooked portions for engaging opposite ends of said pivot pin, and a spring pressure device including a stationary holder and a spring pressed part mounted upon said holder, said spring pressed part being arranged to engage the hooked portions on said supporting parts to hold the open bearings on said supporting parts in engagement with said pivot pin.

CLARENCE W. KUHN.